United States Patent [19]

Kargarzadeh

[11] Patent Number: 5,225,261
[45] Date of Patent: Jul. 6, 1993

[54] TWO TONE VEHICLE DOOR SHELL

[75] Inventor: Reza Kargarzadeh, Riceville, Tenn.

[73] Assignee: Davidson Textron Inc., Dover, N.H.

[21] Appl. No.: 702,493

[22] Filed: May 20, 1991

Related U.S. Application Data

[62] Division of Ser. No. 492,075, Mar. 12, 1990, Pat. No. 5,033,954.

[51] Int. Cl.5 .......................... B32B 3/02; B29C 39/12
[52] U.S. Cl. .......................................... 428/60; 428/31; 264/245; 296/146 R; 296/146 B; 296/146 F
[58] Field of Search .................... 428/60, 31, 119, 120, 428/136; 264/245; 296/146 R, 146 B, 146 F

[56] References Cited

U.S. PATENT DOCUMENTS

| | | | |
|---|---|---|---|
| 4,610,620 | 9/1986 | Gray | 425/434 |
| 4,780,345 | 10/1988 | Gray | 428/36.5 |
| 4,894,004 | 1/1990 | Brault | 264/245 |
| 4,925,151 | 4/1990 | Gray | 264/425 |
| 4,945,682 | 8/1990 | Altman et al. | 49/502 |

*Primary Examiner*—Ellis P. Robinson
*Assistant Examiner*—Charles R. Nold
*Attorney, Agent, or Firm*—Reising, Ethington, Barnard, Perry & Milton

[57] ABSTRACT

A two tone plastic vehicle door shell (10), FIG. 1 has a front surface (12) and a side surface (14) separated into two tone segments (18, 20) (18a, 20a) by an integral two tone trim line (22). The shell's side surface is joined to a return flange (16). The return flange is arranged generally parallel to the front of the shell and includes a side flap (26) thereon which covers a cut-out opening (24) in the return flange on either side of the trim line at the side of the door. The cut-out opening (24) is provided for removing a seal and divider wall assembly from the door shell when thermoplastic powder is cast on a heated mold to form the shell. A tool FIG. 2 for manufacturing the two tone plastic shell includes an electroformed mold (28) having a first surface (29) for forming a front of a shell; a second surface (32) for forming the side edge portion of a shell; and a third surface segment (34) for forming a return flange on a door shell and the third surface segment has a cut-out opening (36) therein and a runout surface (40) providing for entry and removal of a seal and divider wall assembly to seal against a sealing rib (38) in the mold which separates the first, second and third segments into first and second casting surfaces. The divider rib and runout surface are sprayed with thermoplastic material to form a joint between material cast on the first and second casting surfaces and a skin return flap for sealing the cut-out opening.

1 Claim, 3 Drawing Sheets

TWO TONE VEHICLE DOOR SHELL

This is a division of application Ser. No. 492,075, filed on Mar. 12, 1990, now U.S. Pat. No. 5,033,954.

FIELD OF THE INVENTION

This invention relates to vehicle door panels, and more particularly, to vehicle door panels formed as a plastic shell including a front portion, a side edge portion and a return flange and to tooling for manufacturing such plastic shells.

BACKGROUND OF THE INVENTION

In the manufacture of vehicle door panels having a plastic shell forming the inner surface of the door, it is known to form the plastic shell by directing either a liquid suspension of thermoplastic resin material such as polyvinyl chloride or a dry powder of thermoplastic material against a heated electroformed mold for fusing a thin layer of plastic on the mold corresponding to the desired shape of a plastic door shell.

It is also known to form plastic shells with first and second panels of different color joined by an integral joint of plastic material at a two tone trim line. Examples of such plastic shells are shown in U.S. Pat. Nos. 4,562,025; 4,610,620 and 4,692,293.

While such vehicle doors and two tone door panel constructions are suitable for their intended purpose, in the case of certain luxury front door panel arrangements, the door panel has a front surface, a side edge surface and a return flap. In the past, the return flap has been formed as a constant width member. Such constant width members interfere with the formation of two tone trim lines on a door panel.

SUMMARY OF THE INVENTION

Accordingly, an object of the present invention is to provide an improved vehicle door panel formed of thermoplastic material having a front surface, a side surface and a return flap and including a two tone trim line extending across the full width of the front and side surfaces of the door panel to define a two tone color trim line thereacross and wherein the return flap has a cut-out therein and a 90° segment formed therein on either side of the two tone trim line on the side surface of the door to provide for removal of a seal and divider wall assembly from a sealed relationship with the two tone trim line.

Yet another object of the present invention is to provide an improved electroformed tool for forming a door shell wherein the electroformed tool is adapted to be heated and to have thermoplastic material cast thereagainst to form the shell in a shape conforming to that of the casting surfaces of the electroform tool and wherein the tool includes a first surface portion forming the front of a shell; a second surface portion forming the side of a shell and a third surface portion forming a return flange on the shell that is directed in spaced parallelism and behind the front surface of the shell; and the electroform tool further including a raised rib directed across the width of the first surface portion thereof and across the width of the second surface portion thereof adapted to be sealingly engaged by a flexible seal member for separating the electroform tool into first and second chambers for receiving thermoplastic material of different colors.

Still another object is to provide the electroform tool of the preceding object wherein the return flange surface is cut-out on either side of the raised rib and wherein a runout surface is provided to permit entry and retraction of a divider wall and seal assembly on means for distributing thermoplastic material against the casting surfaces of the electroform tool.

Various other objects, features and attendant advantages of the present invention will be more fully appreciated as the same become better understood from the following detailed description when considered in connection with the accompanying drawings in which:

DETAILED DESCRIPTION OF THE PREFERRED EMBODIMENT

Figure 1:
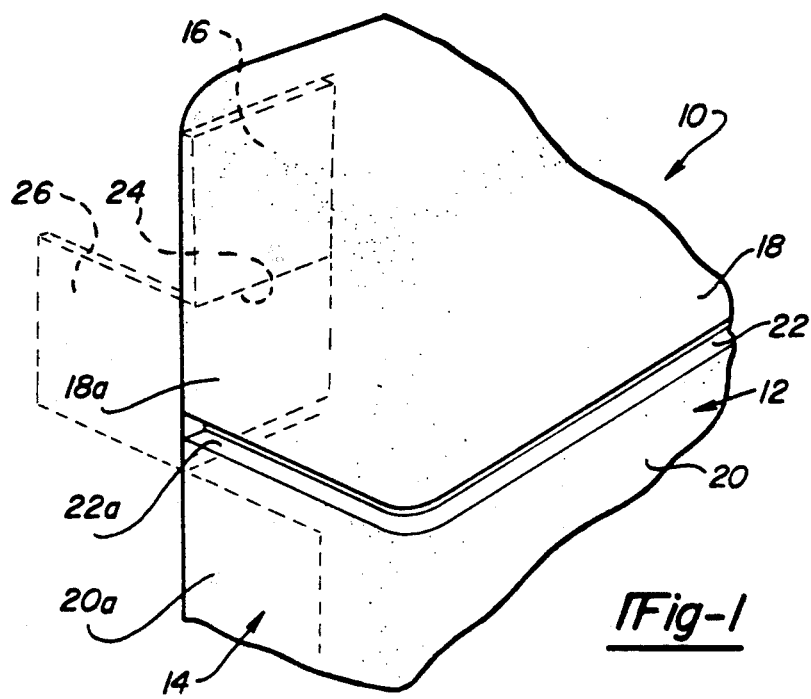
FIG. 1 is a perspective view of a portion of a vehicle door shell including the present invention.

Referring now to FIG. 1, an upper end corner of a door shell 10 is shown made of a thermoplastic material such as cast polyvinyl chloride in the form of a resin material having a resin core with a suitable plasticizer and an outer surface impregnated with pigments for giving the shell a desired color. In accordance with certain principles of the present invention, the door includes a front surface, portion 12, a side surface portion 14, and a 90° segment or return flange portion 16 that are formed by casting the thermoplastic powder material into a mold of suitable material such as nickel, formed by electroforming the nickel on a master mold corresponding to the shape of the final part. The electroform tool is heated by suitable means to cause the plastisol material to be fused thereon during a casting process. The fused material is then cooled and removed from the electroform by a known process. The front surface portion 12 is made up of an upper section 18 and a lower section 20 separated by a two tone trim line 22. The upper section 18 has a different color than the lower section 20 and the breakline 22 forms an integral joint between the upper section 18 and the lower section 20. Likewise, the side surface 14 has an upper section 18a and a lower section 20a also joined by a breakline 22a. As will be described in the following material, the return flange 16 has a cut-out opening 24 therein which is covered by a side flap 26 shown in dotted line relationship prior to final assembly of the shell.

Figure 7:
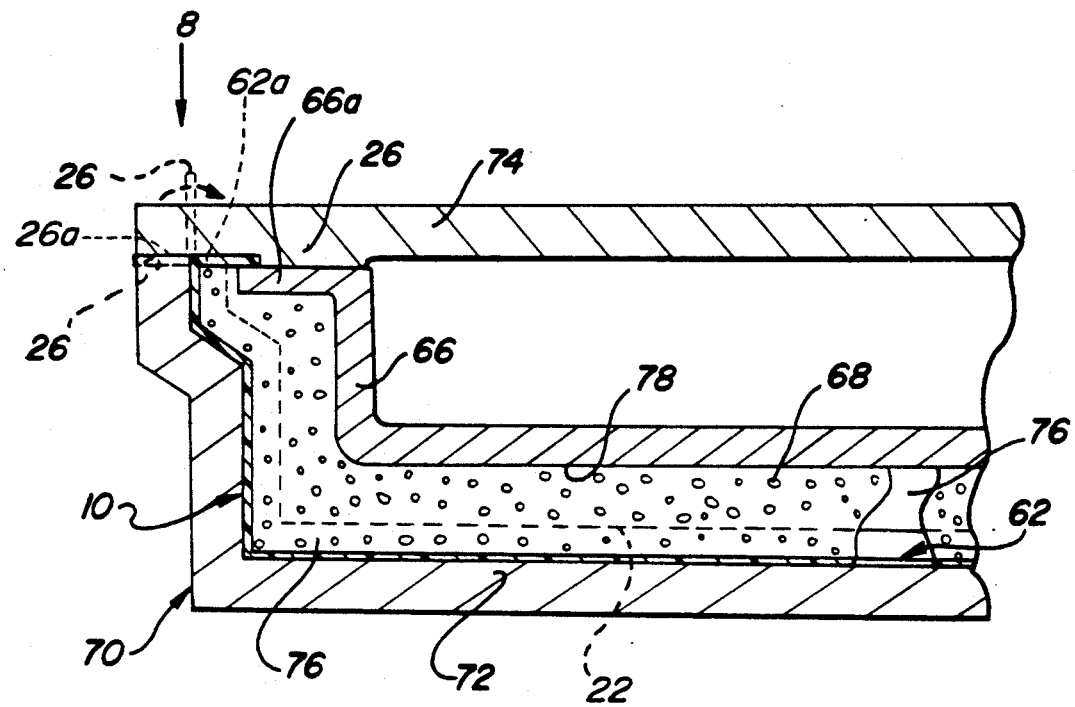
FIG. 7 is a sectional view of a two tone shell foamed with respect to a substrate member.

The flap 26 is preformed at an angle substantially perpendicular to the return flange at the cut-out 24 formed in the return flange 16. The preformed flap 26, as shown in FIG. 1 is axially aligned with the breakline 22a, it is substantially planar with the side surface portion 14 and it is substantially perpendicular to the front surface portion 12, all as shown in FIG. 1. Further, the flap 26 has an upper surface 26a that is adapted to be located in the same plane as the upper end 62a of the recessed joint 62 as shown in FIG. 7.

Figure 2:
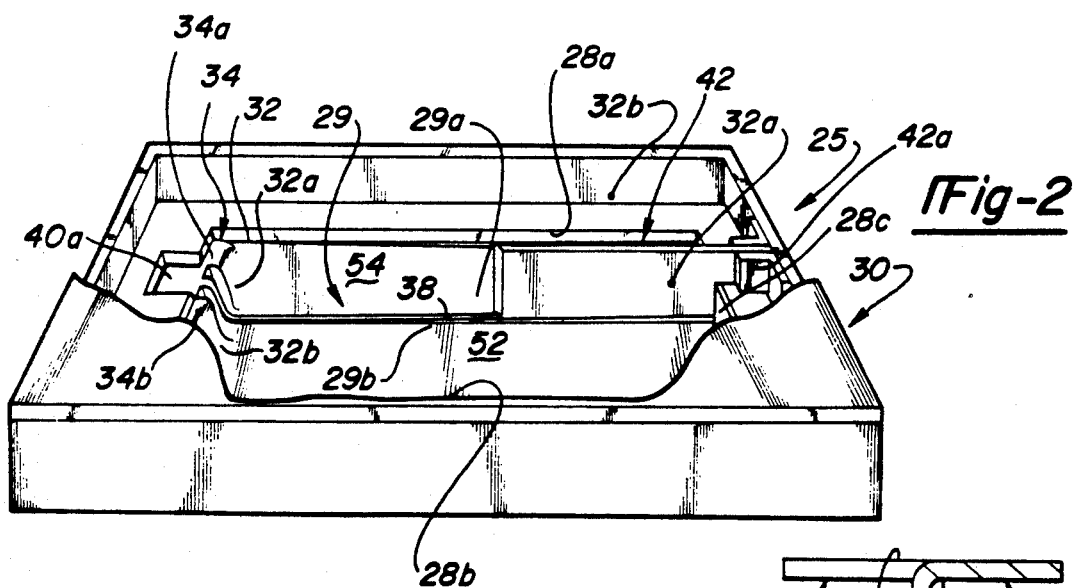
FIG. 2 is a diagrammatic view of a shell casting apparatus including the electroform tool of the present invention.
Figure 4:
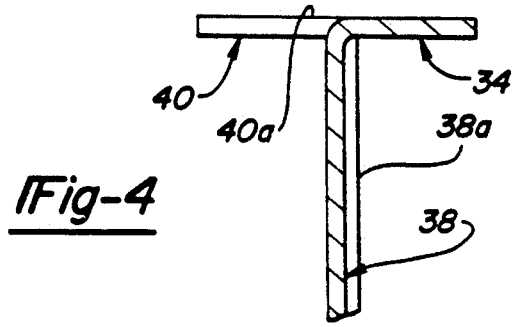
FIG. 4 is a sectional view taken along the line 4—4 in FIG. 3, looking in the direction of the arrows.

Referring now to FIG. 2, a heated tool 25 is illustrated having a nickel alloy electroformed mold 28 with a first surface 29 thereon divided into an upper segment 29a and a lower segment 29b against which powdered material of different colors is cast from a two compartment powder box assembly 30. When the tool 28 is heated, the cast material fuses on the tool surface 29 so as to form the upper and lower sections 18, 20 of the front surface 12. The electroform mold 28 further includes a second surface 32 having segments 32a and 32b thereon that form the upper and lower sections 18a and 20a of the side surface 14. Additionally, the electroform mold 28 includes a return flange segment 34 thereon with a section 34a and a section 34b that combine to form the first and second color portions of the return flange 16. Additionally, the return flange segment 34 includes a cut-out opening 36 therein equally spaced on either side of a sealing rib 38 formed across the width of the second surface 32. A runout surface segment 40 is formed in the electroform mold 28 at the cut-out opening 36 and has an upper surface 40a thereon that is at the same height as the upper surface 38a of the rib as shown in FIG. 4. The cut-out opening 36 provides access for entry and removal of a seal and divider wall assembly 42. The heated tool 25 connects to a powder box 30 shown schematically in FIG. 3. The powder box 30 has first and second compartments 44a and 44b therein separated and sealed apart from one another by the seal and divider wall assembly 42 and adapted to contain the dry plastic particles (a different color in each compartment) for casting against the aforedescribed surfaces. The provision of the cut-out opening 36 in the electroform mold 28 and the runout surface 40 enables the seal and divider wall assembly 42 to be located inside of the electroform mold 28 to be in sealing engagement with the sealing rib 38 on the second surface 32 and on the first surface 30. Furthermore, it enables the seal and divider wall assembly 42 to be removed from the electroform mold 2 after the cast powder material has fused thereon.

Figure 5:
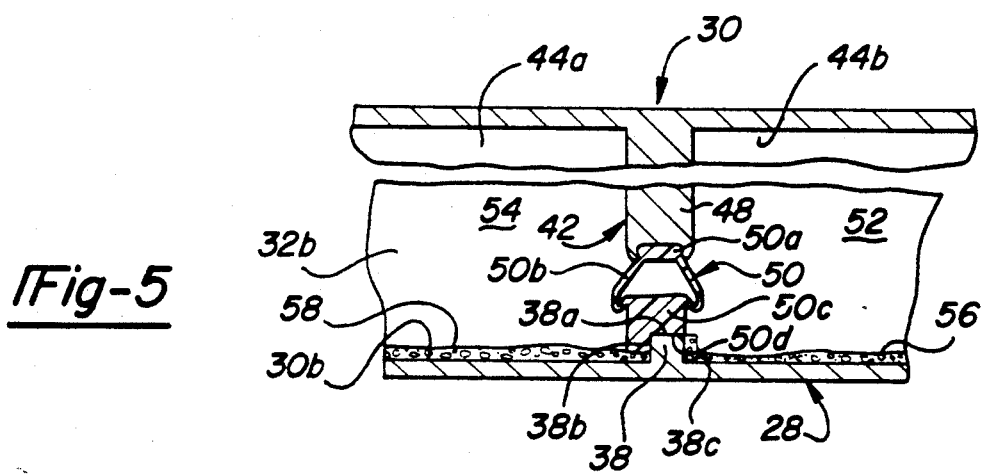
FIG. 5 is a sectional view taken along the line 5—5 of FIG. 3, looking in the direction of the arrows.

Referring now more particularly to FIG. 5, the seal and divider wall assembly 42 includes a wall portion 48 carrying a compressible seal 50 having a base portion 50a connected in a groove 48a of the divider wall 48 and including a compressible segment 50b that is connected to a sealing portion 50c having an undercut surface 50d. Surface 50d covers the upper surface 38a of the sealing rib and part of one side surface 38b thereof leaving the other side surface 38c thereof exposed to plastic material in a casting cavity 52 formed between the divider wall 48 and the side surface portions 28a, 28b, 28c of the electroform mold 28 (as shown in FIG. 2). The other surface 38b of the rib 38 is exposed to dry thermoplastic powder cast into a casting cavity 54 formed on the other side of the divider wall 48 and bounded by the powder box 30, the first surface segment 29b, the second surface segment 32b, and the return flange surface segment 34b and side surfaces 28b, 28c.

The seal and divider wall assembly 42 includes an end extension 42a which covers the runout surface 40 to prevent the material in powder compartments 44a, 44b from being deposited thereon. As will be described, thermoplastic material is sprayed on the runout surface 40 after the powder box 30 and seal and divider wall assemblies are removed from the heated electroform mold 28. For purposes of illustration, in FIG. 2, the end extension 42a is shown as a like cut-out in the opposite side of mold 28.

Figure 3:
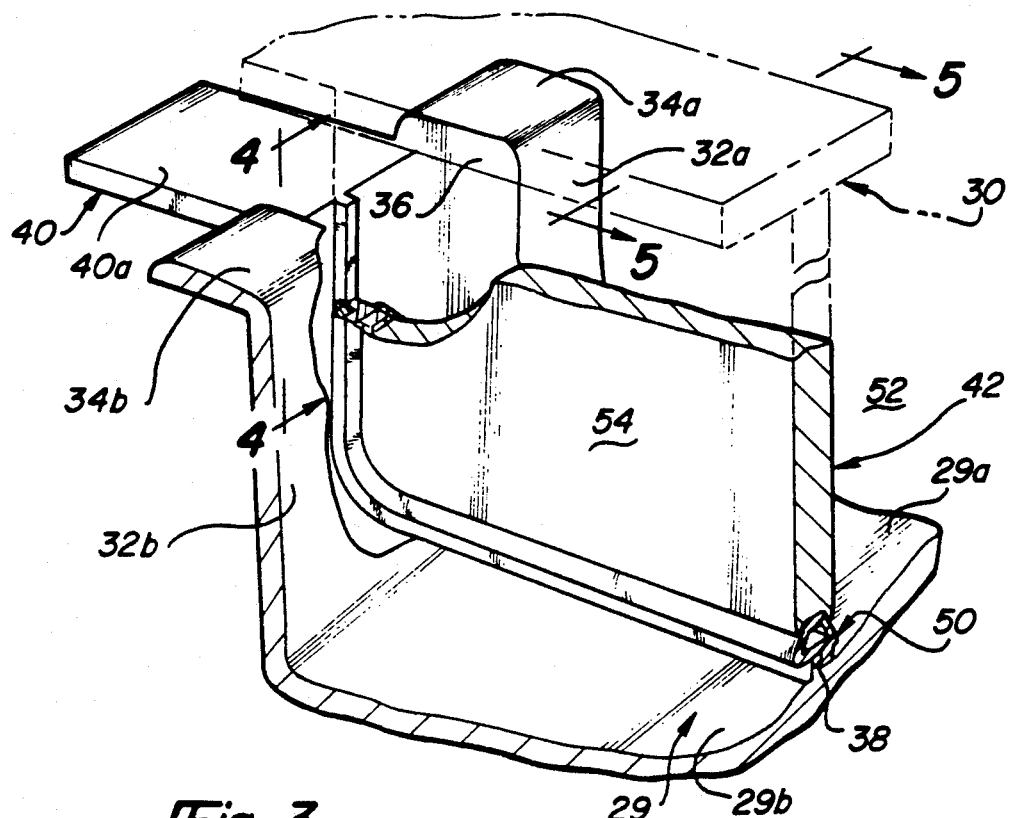
FIG. 3 is an enlarged fragmentary perspective view partially sectioned showing a part of an electroformed tool of the present invention and part of an associated seal and divider wall assembly.

In accordance with certain other principles of the present invention, the electroform tool 28 is heated and the two compartment powder box 30 with a powder compartment 44a for one color of thermoplastic particles and a second powder compartment 44b for another color of thermoplastic particles is arranged such that the electroform tool 28, following heating thereof, is connected to the powder box 30. The seal and divider wall assembly 42 associated with the powder box 30 is located in the cut-out opening 36 in the return flange 34 and aligned with the sealing rib 38 to cause the compressible seal member 50 to seal against the sealing rib 38 on the electroform tool 28 as shown in FIGS. 3 and 5.

The powder box 30 is clamped to the heated electroform mold 28. The combined electroform tool and powder box 30 are then rotated by suitable means to cause thermoplastic powder in each of the powder compartments 44a, 44b to be cast against the first, second and third surface portions 28a-c, 29, 32 and 34 of the electroform tool 28 where they are fused to form a door shell of the form illustrated at 10 in FIG. 1.

One feature of the present invention is shown in FIG. 4 where the runout surface 40 of the runout is located at the same height as the upper surface or distal end 38a of the sealing rib 38. Such an arrangement allows fusible material to be spray deposited upon the surface 40 and the surface 38a to the same elevation following formation of the separate two-tone segments as shown in part by fused powder build-up regions 56, 58 in FIG. 5.

Figure 6:
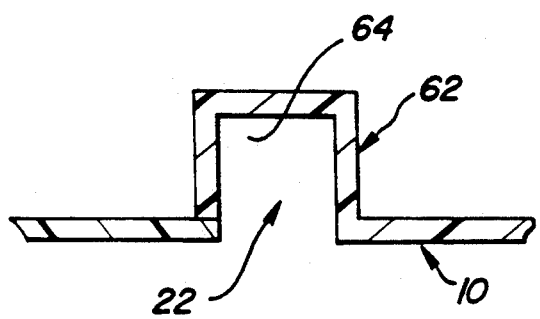
FIG. 6 is an enlarged fragmentary sectional view of an integral joint in the vehicle door shell of FIG. 1.

The aforedescribed arrangement enables the seal and divider wall assembly 42 to be moved from the cut-out opening 36 following casting of the material without affecting the quality of the fused material deposited on the tool 28. Thereafter, a bead of plastisol is spray deposited on the upper surface 38a of the sealing rib 38 and on the runout surface 40 to form an integral joint 62 shown in enlarged section in FIG. 6 with a channel shaped recess 64 at the two tone trim line 22 and to form a side flap 26 for covering the shell cut-out 36.

The door shell 10 shown in FIG. 1 is connected to a substrate by a foam mold process. The return flap 26 seals against leakage through the shell cut-out 36 between the shell 10 and a substrate 66 that is foamed and bonded to the door shell 10 by a layer of foam 68. More particularly, as shown in FIG. 7, the door shell 10 after cooling and removal from the electroform tool 28 is placed in a foam mold apparatus 70 having a mold cavity part 72 and a cover 74. The cover 74 carries the substrate 66 to form a space 76 between the shell 10 and the substrate 66 into which urethane precursors are injected for reaction to form the layer 68 of foam which is bonded to the inboard surface 78 of the substrate 66 and the inside surfaces of the shell 10. A flange section 66a of the substrate 66 which is aligned with the joint 62 is covered by the vertical skin return or flap 26 which is shown (FIG. 7) in broken line in the position as released from the electroform tool 28, and in solid line folded position to cover the cut-out opening 24.

Figure 8:
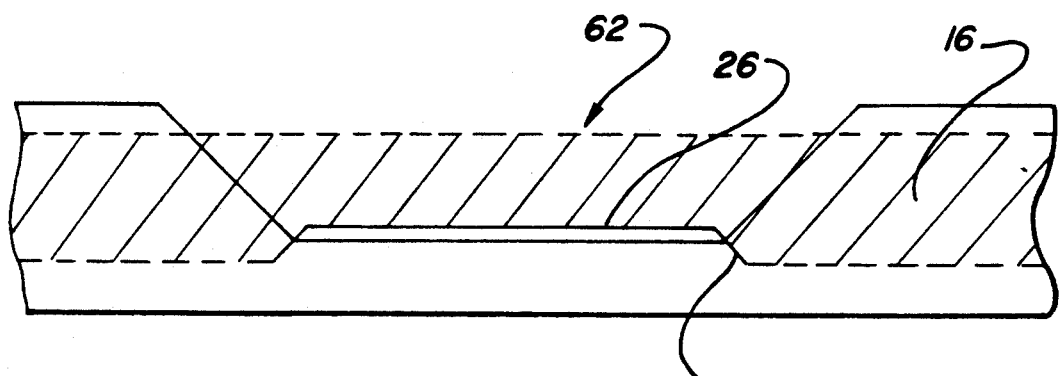
FIG. 8 is an enlarged fragmentary back elevational view of a shell of the present invention assembled to a foamed substrate with the cut-out opening closed by the side flap of the present invention.

FIG. 8 is an elevational view looking in the direction of arrow 8 in FIG. 7 which shows the vertical skin return flap 26 bent over to cover the cut-out 24 formed in the return flap 16 at the two tone breakline 22.

The resultant structure presents a door that has a recessed breakline 22 as defined by recessed joint 62 across the exposed side portion 14 of the door shell 10. Additionally, the structure presents a smooth, folded return covering all portions of the gap between the substrate 68 and the shell 10 to seal the foam molding process.

The electroform mold 28 is configured for use with a divider wall and seal assembly to separate first and second casting surfaces on a heated electroform tool for fusing thermoplastic powders of different colors thereon. The electroform tool is of a simplified construction and results in an integral shell configuration that is adapted to provide a desired uniform, recessed breakline along the front and side surfaces of a door shell and a return flap configuration which will seal between the shell and a substrate during the foam process.

Obviously, numerous modifications and variations of the present invention are possible in light of the above teachings. It is, therefore, to be understood that within the scope of the appended claims the invention may be practiced otherwise than as specifically described herein.

What is claimed is:

1. A thermoplastic door shell for use in fabricating a door having a support substrate and a foamed plastic core, the door shell comprising:

first, second and third integrally formed shell segments; said first and second shell segments having an integrally formed recessed joint separating said first and second shell segments at a two tone color breakline;

said first shell segment forming a two tone color front surface on the door shell;

said second shell segment forming a two tone color side surface on the door shell; and said third shell segment having a free end and an end joined to said second shell segment; said third shell segment extending substantially parallel to said first shell segment and substantially perpendicular to said second shell segment so as to be located in overlying relationship with a substrate to be foam molded with the shell;

means for forming a cut-out in said third shell segment; said means for forming a cut-out aligned with said two tone breakline in said second shell segment and said means for forming a cut-out also aligned with said two tone breakline in said first shell segment;

said recessed joint having an end thereon;

a skin flap on said second shell segment arranged substantially perpendicular to said third shell segment and substantially planar with said second shell segment; said skin flap having a surface thereon locatable in the same plane as said end of said recessed joint upon said skin flap being bent perpendicular to said second shell segment;

said skin flap adapted to be bent to cover said means for forming a cut-out in said third shell segment for sealing against foam leakage through said means for forming a cut-out when the support substrate is foam molded to the thermoplastic door shell.

* * * * *